United States Patent [19]
Andersen et al.

[11] Patent Number: 5,786,080
[45] Date of Patent: Jul. 28, 1998

[54] COMPOSITIONS AND METHODS FOR MANUFACTURING ETTRINGITE COATED FIBERS AND AGGREGATES

[75] Inventors: Per Just Andersen. Santa Barbara; Shaode Ong. Goleta; Simon K. Hodson. Santa Barbara. all of Calif.

[73] Assignee: E. Khashoggi Industries. Santa Barbara. Calif.

[21] Appl. No.: 627,487

[22] Filed: Apr. 3, 1996

[51] Int. Cl.$^6$ .............................. B32B 19/00; B05D 1/12
[52] U.S. Cl. .................... 428/357; 428/364; 428/372; 428/375; 428/367; 428/389; 428/393; 428/394; 428/379; 427/180; 427/200; 427/206
[58] Field of Search ........................ 428/372, 375, 428/389, 394, 393, 379, 357, 364, 367; 427/180, 200, 206

[56] References Cited

U.S. PATENT DOCUMENTS

| | | |
|---|---|---|
| 3,403,205 | 9/1968 | Ottenholm . |
| 4,255,398 | 3/1981 | Tanaka et al. . |
| 5,545,297 | 8/1996 | Andersen et al. ............... 264/102 |

FOREIGN PATENT DOCUMENTS

| | | |
|---|---|---|
| 54-114582 | 9/1979 | Japan . |
| 2265916 | 10/1993 | United Kingdom . |
| WO 92/15754 | 9/1992 | WIPO . |

OTHER PUBLICATIONS

Bensted. *Hydration of Portland Cement, Hydration of Portland Cement,* Undated Publication.

*Primary Examiner*—Patrick Ryan
*Assistant Examiner*—J. M. Gray
*Attorney, Agent, or Firm*—Workman. Nydegger & Seeley

[57] ABSTRACT

Compositions and methods for the deposition of ettringite ($3CaO \cdot Al_2O_3 \cdot 3Ca(SO_4) \cdot 30\text{-}32H_2O$) onto the surfaces of fibers. aggregates. and other fillers. The ettringite is produced in situ within an aqueous suspension while in proximity to the fibers. aggregates. or other fillers to form a mineralized composite material comprising ettringite coated fibers. aggregates or other fillers. Ettringite treated fibers. aggregates. or other fillers are formed by adding chemical reactants such as calcium oxide and aluminum sulfate. which react together in the presence of water to form ettringite. which then precipitates onto the surface of the fibers or other substrates being treated. The ettringite treated fibers. aggregates or other fillers can be added to hydraulically settable materials to improve the chemical and mechanical bond between the fibers or other substrates within the resulting hardened hydraulically settable composite material. particularly a cementitious or concrete material.

33 Claims, 1 Drawing Sheet

COMPOSITIONS AND METHODS FOR MANUFACTURING ETTRINGITE COATED FIBERS AND AGGREGATES

BACKGROUND OF THE INVENTION

1. The Field of the Invention

The present invention relates to the treatment of fibrous and particulate substrates with a mineral coating. More particularly, ettringite crystals are precipitated in situ within an aqueous medium onto the surface of fibers and other substrates in order to improve their chemical and mechanical compatibility within a hydraulically settable matrix, especially a cementitious matrix.

2. The Relevant Technology

Discontinuous, discrete fibers and continuous fibers or filaments (hereinafter "fibers") may be incorporated into a variety of materials to form a fiber-reinforced composite material, which generally increases the toughness, flexibility, tensile strength, and flexural strength of the composite material and articles made therefrom. Such strengthening and toughening effect is significant whenever the tensile and flexural strength of the fibers exceeds the tensile and flexural strength of the otherwise non-fiber-reinforced material. One type of such material includes hydraulically settable composite materials, more particularly cementitious materials, which generally have high compressive strength but comparatively very low tensile and flexural strengths. The level of strength, flexibility, and toughness that is imparted by the fibers to the composite material or article corresponds to the degree of mechanical and/or chemical interaction between the fibers and the other components within the composite material. In the case of hydraulically settable materials, more particularly cementitious materials, an important variable is the degree of mechanical and chemical interaction between the fibers and the hydraulically settable binder, more particularly, the hydraulic cement binder.

In general, fibers are able to strengthen and toughen a variety of hydraulically settable materials and articles made therefrom. Fiber-reinforced hydraulically settable materials are prepared by mixing fibers into a hydraulically settable mixture containing water and a hydraulically settable binder like hydraulic cement, gypsum, or calcium oxide (hereinafter "hydraulically settable," "hydraulic" or "cementitious" compositions, materials, or mixtures) and then allowing the mixture to harden into the desired shape of the article. Hydraulically settable materials also typically include one or more types of aggregates, which can improve the strength, flow properties, and cost effectiveness of the hydraulic cement composite, or concrete material. The hydrated hydraulically settable binder forms a structural matrix that holds the fibers and other components together.

Fibers have been shown to greatly improve a variety of mechanical properties of the final hardened hydraulically settable composite material, including flexural strength, impact strength, toughness, fracture energy, fatigue strength, ductility, tensile strength, durability, and resistance to cracking. Nevertheless, the ability of the fibers to impart a substantial degree of the theoretical flexural and tensile strength based on the strength of the individual fibers to the hydraulically settable composite material is often reduced by the inability to form an adequate mechanical or chemical bond or interface between the fiber and the hydraulically settable structural matrix of the composite material.

Many of the fibers that might be used to reinforce hydraulically settable materials are cellulosic or otherwise organic, which makes them relatively chemically incompatible with the hydraulically settable binder, which forms an inorganic, insoluble crystalline salt upon hydration. Whenever the bond or interface between the fiber and the hydraulically settable structural matrix is significantly weaker than the strength of the fibers, the fibers will generally experience "pull-out" upon the application of a strain on the composite article. If a pull-out of the fibers occurs at or only slightly above the stress necessary to cause the hydraulically settable structural matrix to first begin to rupture, it means that the fibers within the structural matrix are imparting little, if any, increased tensile or flexural strength to the hardened composite material.

A pull-out effect may be desired in some cases over a better mechanically or chemically anchored fiber in order to improve the ductility, toughness, fracture energy, and flexibility of the article. However, in other cases it may be desirable to derive more of the tensile and flexural strength from the fibers by increasing the mechanical and/or chemical interaction or interface between the fibers and the hydraulically settable matrix. Increasing the mechanical or chemical interaction between the fibers and the hydraulically settable matrix would be expected to result in more securely anchored fibers within the hydraulically settable structural matrix. This, in turn, would lessen the pull-out effect and increase the tensile and flexural strength of the composite material by increasing the magnitude of the stress required to break the bond interface and dislodge the fibers from the hydraulically settable matrix. In the case where the bond interface between the fibers and the hydraulically settable matrix approaches or exceeds the strength of the fibers, there will be little or no pull-out effect, and the hydraulically settable composite article will not fail until a stress that is greater than the tensile or flexural strength of the fibers is applied to the composite article.

As stated above, the pull-out effect of fibers due to the generally weak bond or interface between the fiber and the hydraulically settable structural matrix of a hardened article is mainly the result of the chemical incompatibility between the fibers and the reaction products of the hydraulically settable binder and water that form the hydraulically settable structural matrix. Extremely smooth fibers also offer little mechanical anchoring because there is less for the hydraulically settable matrix to "grab onto" compared to rougher or more irregular fibers. The hydration reaction products of the hydraulically settable binder and water form structures which are mechanically and chemically complex but can be generally characterized as insoluble inorganic crystalline minerals having varying geometrical shapes. Fibers commonly utilized in hydraulically settable mixtures can be characterized as being larger than the crystals and having a surface chemistry which is chemically incompatible with the inorganic crystalline minerals, which inhibits the formation of a chemically integral bond. Moreover, the surface features of the fibers may also be so dissimilar to the crystalline structures of the hydraulically settable material that it is difficult to obtain a relatively strong mechanical bond between the fibers and the hydraulically settable materials.

One way to increase the chemical and mechanical compatibility between the fibers and the hydraulically settable matrix would be to mineralize the surfaces of the fibers. One previously taught method of mineralizing the fiber surfaces involved the deposition of calcium carbonate ($CaCO_3$) onto the fiber surfaces, which is disclosed in United Kingdom Patent Application No. 2,265,916 A (hereinafter "U.K. '916"). U.K. '916 teaches the deposition of calcium carbonate onto fibers by precipitating the calcium carbonate in situ from a suspension containing fibers and an aqueous phase containing the necessary reactants to precipitate calcium carbonate. More specifically, the method consists of contacting microfibrillated fibers held in suspension in an aqueous medium through moderate agitation with calcium ions ($Ca^{2+}$) and carbonate ions ($CO_3^{2-}$) so as to effect crystallization of calcium carbonate in situ. The calcium ions are first introduced by way of lime (CaO) with moderate agitation, and carbonate ions are thereafter introduced indirectly by the injection of carbon dioxide into the aqueous solution by vigorous agitation. The resulting mineralized fibers have crystals of precipitated calcium carbonate organized in clusters of granules which are trapped by and between the microfibrils of the microfibrillated fibers.

According to U.K. '916, the stated goal or advantage of precipitating calcium carbonate onto fibers is to increase the loading of calcium carbonate within paper without a decrease in strength which typically occurs as the loading of inorganic fillers such as calcium carbonate is increased. Although calcium carbonate provides an excellent filler in the manufacture of paper, particularly in its whitening effect, its usefulness in increasing the bond interface between fibers and a hydraulically settable matrix is limited. While the calcium carbonate would be expected to increase the chemical and mechanical compatibility of fibers treated according to U.K. '916, calcium carbonate itself forms a relatively weak crystalline structure, which would easily rupture upon application of a stress great enough to cause the pull-out of otherwise untreated fibers. In other words, treating fibers with calcium carbonate would only marginally increase the bond or interface between the fibers and the hydraulically settable matrix and would still result in substantial pull-out of the fibers from the hydraulically settable materials, while not significantly allowing the fibers to impart the upper limit of their tensile and flexural strength to the hydraulically settable composite material.

In addition to fibers, hydraulically settable materials typically include one or more types of nonfibrous aggregates, which improve the strength (particularly compressive strength), flow properties, and cost effectiveness of the hydraulic cement composite or concrete material. Increasing the strength of the bond interface between the aggregate particles and the hydraulically settable binder would also be expected to increase the overall strength, particularly compressive strength, of the hardened hydraulically settable composite material.

In view of the foregoing, it would be a significant advancement in the art to provide compositions and methods for treating fibers to make them more chemically and mechanically compatible with hydraulically settable materials, particularly cementitious materials, thereby allowing the fibers to impart greater tensile and flexural strength to the hydraulically settable materials.

It would be a further advancement in the art to provide compositions and methods for mineralizing the surface of fibers in order to provide the aforementioned increase in chemical and mechanical compatibility between the fibers and the hydraulically settable binder.

It would be an additional advancement in the art if such compositions and methods yielded mineralized fibers in which the deposited minerals resulted in significantly increased mechanical anchoring of the fibers within the hydraulically settable matrix.

Finally, it would be an advancement in the art to provide compositions and methods for treating aggregates in order to increase the strength of the bond between the aggregates and the hydraulically settable structural matrix.

Such compositions and methods are disclosed and claimed herein.

SUMMARY AND OBJECTS OF THE INVENTION

The present invention provides compositions and methods for the deposition of minerals onto the surfaces of fibers and other particulate fillers. More specifically, the present invention provides compositions and methods for the mineralization of fiber and other filler surfaces with crystalline ettringite (or $3CaO \cdot Al_2O_3 \cdot 3CaSO_4 \cdot 30-32H_2O$).

Fibers and other particulate fillers treated with ettringite within the scope of the present invention can be utilized within any type of composition or mixture. Ettringite treated fibers and other substrates are particularly suitable for being utilized with hydraulically settable materials, especially cementitious materials. Because ettringite is an intermediate reaction product produced during the hydration of hydraulic cement binders, fiber and other filler surfaces treated with ettringite would be expected to become more chemically compatible and integrated into a hydraulically settable matrix. This in turn results in the ettringite treated fibers and other fillers being more securely anchored within the hydraulically settable structural matrix of hydraulically settable materials. The use of ettringite coated fibers and other fillers within a hydraulically settable composite material increases the tensile and flexural strengths of the resulting structural matrix of the composite material.

Ettringite coated fibers and other substrates are prepared by introducing fibers or other substrates into water to form a slurry or suspension in which the aqueous phase includes calcium hydroxide ($Ca(OH)_2$) and aluminum sulfate ($Al_2(SO_4)_3 \cdot 18H_2O$), which react together in the presence of water to form the insoluble precipitate mineral ettringite. The precipitated ettringite crystals tend to flocculate onto the surfaces of the fibers or other substrates, which provide crystallization points for the ettringite to form. In alternative embodiments, ettringite may be formed by: (1) reacting calcium sulpho-aluminate ($4CaO \cdot 3Al_2O_3 \cdot SO_3$) with gypsum ($CaSO_4 \cdot 2H_2O$) in the presence of water; (2) reacting lime (CaO) and ammonium alum ($2AlNH_4(SO_4)_2 \cdot 12H_2O$) in the presence of excess water; and (3) reacting monocalcium aluminate ($CaO \cdot Al_2O_3$) with calcium sulfate in the presence of water. In the latter two methods, it is necessary to include excess lime (CaO) or calcium sulphate in solution at the end of the reaction in order to create stable ettringite crystals that do not decompose to give alumina gel as a second solid phase.

When the ettringite treated fibers and other substrates are added to a hydraulically settable mixture, a more integral bond interface is formed between the ettringite treated fibers and the hardened hydraulically settable structural matrix. The integral bond formed between the hardened hydraulically settable structural matrix and the fibers results from the increased chemical and mechanical compatibility of ettringite with the hydraulically settable structural matrix. It is within the scope of the present invention to deposit ettringite onto any type of fiber or substrate. Examples of fibers which are particularly suitable for being treated with ettringite include, but are not limited to, cellulosic fibers, wood fibers, plant fibers, protein fibers, organic polymer fibers, ceramic fibers, carbon fibers and metal fibers. More specific examples include, but are not limited to, polyvinyl alcohol fibers, polylactic acid fibers and steel fibers.

Ettringite can also be deposited onto aggregates to improve the compatibility and, hence, the chemical and mechanical bond between the aggregates and the hydraulically settable structural matrix. Ettringite is deposited onto the aggregate surfaces using the same reactions and methods described above for depositing ettringite onto fibers. Whether a particular filler material constitutes a "fiber" or an "aggregate" is often unclear, particularly if the fibers have a relative low aspect ratio (ie., <10:1), or if the aggregate particles have a length that is significantly greater than the width. Regardless of whether a filler is a "fiber" or an "aggregate" if it has been coated or otherwise treated with ettringite as set forth herein it is certainly within the purview and scope of the present invention. Examples of aggregates which are particularly suitable for being treated with ettringite include, but are not limited to, natural rock and synthetic materials. Useful aggregates include, but are not limited to, slag, expanded clay, calcium carbonate, talc, chalk and shale.

In light of the foregoing, an object of the present invention is to provide novel compositions and methods for treating fibers to make them more chemically and mechanically compatible with hydraulically settable materials, particularly cementitious materials, thereby allowing the fibers to impart greater tensile and flexural strength to the hydraulically settable materials.

Another object is to provide compositions and methods for mineralizing the surface of fibers in order to provide the aforementioned increase in chemical and mechanical compatibility between the fibers and the hydraulically settable binder.

An additional object is to provide compositions and methods for mineralizing fibers in which the deposited minerals result in significantly increased mechanical anchoring of the fibers within the hydraulically settable matrix.

Finally, another object is to provide compositions and methods for treating aggregates in order to increase the strength of the bond between the aggregates and the hydraulically settable structural matrix.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention may be obtained, a more particular description of the invention briefly described above will be rendered by reference to a specific embodiment thereof which is illustrated in the appended drawing. Understanding that this drawing depicts only a typical embodiment of the invention and is not therefore to be considered to be limiting of its scope, the invention will be described and explained with additional specificity and detail through the use of the accompanying drawing in which.

DETAILED DESCRIPTION OF THE PREFERRED EMBODIMENTS

Figure 1:
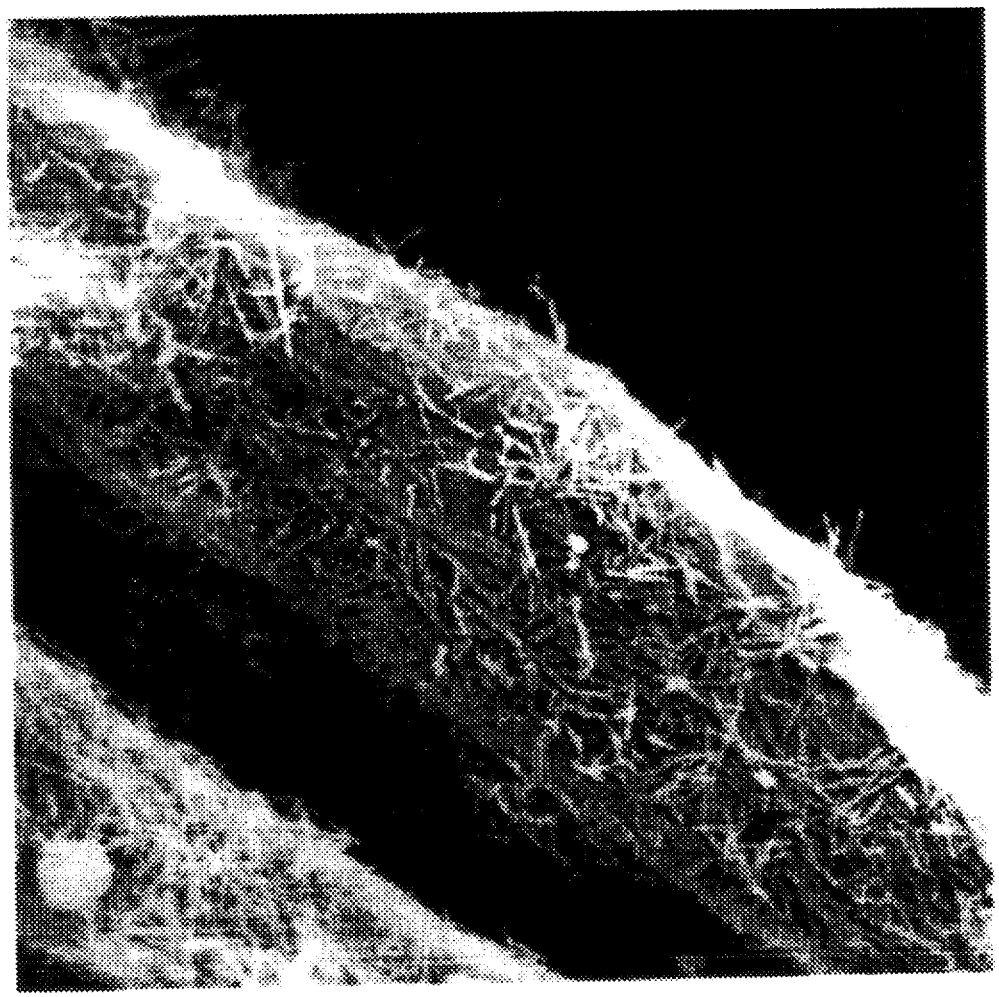
FIG. 1 is a scanning electron microscope photograph of the structure of ettringite bonded to the surface of hardwood fibers.
Figure 1:
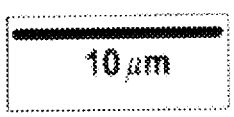

The present invention relates to compositions and methods for the manufacture of mineralized fibers in which crystalline ettringite is deposited onto the exterior of the fibers. The present invention more particularly relates to methods for precipitating ettringite onto the surfaces of fibers in an aqueous suspension, followed by the isolation of the ettringite coated fibers. The compositions and methods may alternatively be employed in order to deposit ettringite onto the surface of any solid or particulate filler, such as aggregates, whenever greater chemical and mechanical interaction between the filler and the hydraulically settable matrix is desired.

The fibers or aggregates utilized as a substrate for the deposition of ettringite are generally inert or nonreactive. That is, the fiber or aggregate substrate generally do not react with water within, e.g., a hydraulically settable mixture. Accordingly, a fiber or aggregate utilized as a substrate is collectively referred to in this specification and the appended claims interchangeably by the terms "inert filler", "nonreactive filler" or "nonreactive substrate material". The nonreactive substrate material includes discrete fibers or aggregate particles that will collectively be referred to as "individual substrate components." The ettringite is deposited on the surfaces of the nonreactive filler substrate material, particularly the exterior surfaces, as well as porous indentations or voids within the surface or interior of the substrates.

After the nonreactive filler substrate material has been coated with ettringite it is referred to by the terms "coated", "mineralized" or "treated" nonreactive filler substrate material, "composite product," "mineralized composite material," or by a phrase such as a "ettringite coated nonreactive filler." The ettringite/substrate composites (i.e., the "mineralized composite material") manufactured according to the present invention should be distinguished from the theoretically possible formation of ettringite onto the surfaces of fibers, aggregates, or other fillers within cementitious compositions during hydration of the hydraulic cement binder. It is to be understood that the formation of ettringite onto the surfaces of the fibers and aggregate particles is a preliminary treatment process that yields ettringite coated fibers and aggregates (i.e., the "mineralized composite material") prior to their subsequent addition to, e.g., cementitious mixtures.

I. GENERAL DISCUSSION

The fibers or other filler particles treated according to the methods of the present invention are coated with the mineral compound ettringite ($3CaO \cdot Al_2O_3 \cdot 3CaSO_4 \cdot 30-32H_2O$). The ettringite is produced in situ while in proximity to the fibers or other fillers and deposited on the exterior of the fibers or filler particles to form an ettringite/fiber composite material (or ettringite/substrate composite). Because of the nature of how ettringite is deposited onto the fiber or other substrate surfaces, it forms a strong bond with the fibers or other substrate surfaces. When ettringite treated fibers or other substrates are incorporated into a hydraulically settable matrix, the ettringite crystals on the substrate surfaces are able to chemically and mechanically interact with the hydraulically settable binder, thereby creating more securely anchored fibers or particles within the hydraulically settable structural matrix, particularly a cementitious matrix.

The compatibility of the ettringite coating and the hydration reaction products in the structural matrix of a hardened hydraulically settable article enables the ettringite crystals to chemically react with or, at a minimum, to interlock with the hydration reaction products to form a more integral bond. This is especially true in the case of a hydrating hydraulic cement, such as portland cement, in which ettringite is formed as an intermediate reaction product. Thus, the ettringite on the fiber surfaces will be virtually indistinguishable from the intermediate ettringite products and, hence, serve to chemically incorporate the fibers or other ettringite-treated substrates into the hardened structural matrix. The ettringite crystal structure within an ettringite/fiber composite is shown in FIG. 1, which is a scanning electron microscope photograph of ettringite crystals bonded to hardwood fibers. The ettringite crystals are generally hexagonal prismatic or acicular crystals.

Adding ettringite treated fibers to hydraulically settable mixtures during any stage of the hydration of hydraulically settable materials will result in a chemically and/or mechanically integral bond between the treated fibers and the resulting hardened hydraulically settable structural matrix. Although ettringite is generally formed during the early hydration of hydraulically settable materials, particularly portland cements, it is not necessary to add the ettringite treated fibers during this stage of the hydration reaction of the hydraulically settable materials to form an integral bond between the ettringite treated fibers and the hydraulically settable structural matrix, as the ettringite treated fibers are compatible with the hydration materials throughout the hydration reaction.

It is believed that the concentration of ettringite within a hydraulically settable structural matrix may be present in higher concentrations near the ettringite treated fibers, which would further increase the compatibility between the ettringite treated fibers and the hydration reaction products within the structural matrix of a hydraulically settable composite material. In support of this theory, it has been observed that when ettringite forms in concrete it typically grows in open spaces such as the interfacial zone between aggregates and cementitious matrix. In addition, it is possible that the ettringite coated fibers and other substrates constitute reactive nucleation sites for the further formation of ettringite crystals.

It is within the scope of the present invention to cover at least a portion of the exterior surface of any type of fiber with ettringite. The fibers can be either hydrophilic or hydrophobic. Examples of fibers which are particularly suitable for being treated with ettringite include, but are not limited to, cellulosic fibers, wood fibers, plant fibers, protein fibers, organic polymer fibers, ceramic fibers, carbon fibers, and metal fibers. More specific examples of organic polymer fibers include, but are not limited to, polyvinyl alcohol fibers, polylactic acid fibers and steel fibers. The percentage of the exterior surface of an individual fiber covered with ettringite can range from about 0.01% to about 100%. In addition, crevices or other depressions or voids within the fiber or substrate interior can also become coated or filled with ettringite using the processes of the present invention.

Ettringite can be precipitated onto fibers within an aqueous mixture by adding various combinations of chemical reactants to the water and fiber slurry. The basic steps involve forming a suspension or slurry by adding together fibers, water, and at least two chemical reactants which form ettringite while in the presence of water and then isolating the ettringite coated fibers from the suspension.

According to one method of the present invention, ettringite may be formed by the following chemical equation:

$$6Ca(OH)_2 + Al_2(SO_4)_3 \cdot 18H_2O + 6 - 8H_2O =$$
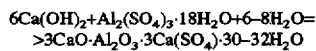

wherein calcium hydroxide ($Ca(OH)_2$) is first added to a mixture of fibers and water; thereafter aluminum sulfate ($Al_2(SO_4)_3 \cdot 18H_2O$) is mixed into the aqueous mixture including $Ca(OH)_2$. Stoichiometric equivalent amounts of calcium hydroxide and aluminum sulfate are weighed to yield ettringite according to the above formula (water is included in excess). In other words, approximately six equivalents of $Ca(OH)_2$ are added for every equivalent of $Al_2(SO_4)_3$. Ettringite is formed thereby and, being in close proximity to the fibers, it is deposited onto the fiber surfaces. The deposition of ettringite onto the fiber surfaces is primarily due to the absorption of dissolved calcium hydroxide ($Ca(OH)_2$) into the surface of the fibers when the calcium hydroxide is mixed into the fibrous slurry. The calcium hydroxide added to the fibrous slurry will be fully dissolved into the aqueous phase depending on the amount of water present, since calcium hydroxide has a solubility of about 1 g per liter of water. After the ettringite has been formed onto the fiber surfaces, the excess water and solutes are removed from the suspension by filtration of the ettringite-treated fibers to yield the ettringite/fiber composite.

Before adding the ettringite forming reactants, the mixture of fibers and water are moderately mixed to disperse the fibers to be treated. It may be preferable for the fibers to be subjected to minimal shear and stress during the dispersion of the fibers in water to avoid rupturing and fibrillating the fibers. Rupturing and/or shortening of the fibers decreases the toughness of articles formed from such fibers as the fibers can be weakened and/or anchored over a shorter length of the hydraulically settable structural matrix of the article. Excessive fibrillation of the fibers weakens the tensile strength of the fibers and should generally be minimized. Nevertheless, to the extent that fibrillation occurs without substantially decreasing the tensile strength of the fibers it may be beneficial as the microfibrilated fibers have an increased surface area for the bonding of the ettringite onto the fibers.

The dispersion of the fibers in water is generally necessary to disagglomerate the fibers. Additionally, when using hydrophilic fibers the mixing of the fibers in water causes the surface area of the fibers to increase as the fibers expand. After the fibers are sufficiently dispersed in water, calcium hydroxide ($Ca(OH)_2$) is added and dissolved into the aqueous phase. The aluminum sulfate ($Al_2(SO_4)_3 \cdot 18H_2O$) is thereafter mixed and dissolved within the aqueous solution. The calcium hydroxide and aluminum sulfate react in the presence of water to cause the generation and subsequent precipitation of the relatively insoluble ettringite. The fibers provide crystallization points for the ettringite to form and grow crystals. The excess water is then removed by filtration. Dispersants can be added to the aqueous slurry after the formation of ettringite to prevent agglomeration of the individual ettringite treated fibers. The term "dispersants" includes those substances which are commonly referred to in the cement industry as "superplasticizers". It is also within the scope of the present invention to add a rheology modifier, a binder, or a filler to the ettringite treated fibers.

According to another method of the present invention, ettringite may be formed by the following chemical equation:

$$4CaO \cdot 3Al_2O_3 \cdot SO_3 + 2CaSO_4 \cdot 2H_2O + 31\ H_2O =$$
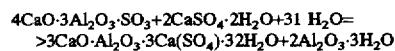

The preferred method for forming ettringite according to the above equation involves preblending the solid reactants, calcium sulpho-aluminate ($4CaO \cdot 3Al_2O_3 \cdot SO_3$) and gypsum dihydrate ($CaSO_4 \cdot 2H_2O$), and then mixing the fibers and water to form a fibrous suspension. The preblended solid reactants are then intermixed with the fibrous suspension to form a suspension comprising an aqueous phase and fibers. The solid reactants are dissolved into the aqueous phase, where they react to form ettringite according to the above equation. Thereafter, the excess water is drained from the suspension to yield ettringite treated fibers. Due to the relatively low cost of the calcium sulpho-aluminate ($4CaO \cdot 3Al_2O_3 \cdot SO_3$) it is useful for industrial scale production of ettringite.

In another embodiment, ettringite is formed by the following chemical equation:

$$6CaO + 2AlNH_4(SO_4)_2 \cdot 12H_2O + 20H_2O => 3CaO \cdot Al_2O_3 \cdot 3Ca(SO_4) \cdot 32H_2O + (NH_4)_2SO_4$$

The preferred method of forming ettringite according to the above equation involves preblending the solid reactants, (CaO) and ($2AlNH_4(SO_4)_2 \cdot 12H_2O$), and forming a separate slurry of fibers and water. The preblended solid reactants are then intermixed with the slurry of fibers and water to form a suspension. The preblended solid reactants react in the presence of water to form ettringite, which is deposited onto the fiber surfaces. The ettringite treated fibers are isolated from the suspension by draining the excess water.

In yet another embodiment, ettringite is formed by the following chemical equation:

$$3CaO \cdot Al_2O_3 + 3CaSO_4 + 35H_2O => 3CaO \cdot Al_2O_3 \cdot 3Ca(SO_4) \cdot 32H_2O + 2Al(OH)_3$$

The preferred method of forming ettringite according to the above equation involves preblending the solid reactants, ($3CaO \cdot Al_2O_3$) and ($CaSO_4$), and forming a separate slurry of fibers and water. The preblended solid reactants are then intermixed with the aqueous fiber slurry to form a suspension. The preblended solid reactants react in the presence of water to form ettringite, which is deposited onto the fiber surfaces. The excess water is then drained from the suspension to yield ettringite treated fibers.

The ettringite treated fibers formed by the above methods are novel composite products and may be used in any desired application. As stated above, they are useful as a strengthening aid within hydraulically settable composite materials. They have been shown to increase the tensile strength and flexural strength of such composite materials compared to where ordinary fibers are used.

Ettringite can also be deposited onto the surface of any solid or particulate filler, such as aggregates, to improve the mechanical and chemical compatibility of the aggregates and a hydraulically settable matrix. Ettringite can be deposited on aggregates using the same compositions and methods set forth herein for treating fibers. The aggregate surfaces, in the same manner as the fibers, provide crystallization points for the ettringite to form and grow into crystals. A composite product is formed by coating at least a portion of the exterior surface of an aggregate material with precipitated ettringite.

Whether a particular filler material constitutes a "fiber" or an "aggregate" is often unclear, particularly if the fibers have a relatively low aspect ratio (i.e., <10:1), or if the aggregate particles have a length that is significantly greater than the width. Regardless of whether a filler is a "fiber" or an "aggregate", if it has been coated or otherwise treated with ettringite as set forth herein it is certainly within the purview and scope of the present invention. Aggregates which are suitable for being treated with ettringite include aggregates comprising either naturally occurring material or synthetic material. More specific examples include aggregates such as sand, gravel, rocks, limestone, silica, alumina, slag, expanded clay, calcium carbonate, talc, chalk, and shale.

The ettringite coated inert fillers have many applications in different industries. As s discussed above, the fillers are very useful in fiber reinforced concrete as well as in fiber reinforced ceramics. Additionally, the fillers are useful in the manufacture of sheets and foamed products which are chemically or also structurally compatible with the ettringite treated filler such as those formed from hydraulically settable mixtures.

II. EXAMPLES OF THE INVENTION

Below are specific examples of the treatment of fibers with ettringite according to the present invention. These examples are illustrative only and not the definitive manner for obtaining ettringite treated fibers, aggregates or fillers. The examples involve the treatment of wood fibers; however, the same steps can also be used to treat aggregates or any other types of fibers.

Example 1

In this example, fibers were treated with ettringite according to the following equation:

$$6Ca(OH)_2 + Al_2(SO_4)_3 \cdot 18H_2O + 6-8H_2O => 3CaO \cdot Al_2O_3 \cdot 3Ca(SO_4) \cdot 30-32H_2O$$

Ettringite treated fibers were obtained by first dispersing 1000 g of dry Hard Wood fiber in 10,000 g water using a WELBILT Vaimixer at 200 rpm for 30 minutes. To this mixture, 180 g of $Ca(OH)_2$ were added and the resulting aqueous slurry mixed at 200 rpm for 20 minutes.

A second aqueous solution was prepared by dissolving 270 g of $Al_2(SO_4)_3 \cdot 18H_2O$ in 2000 g of water and then mixing the solution at 150 rpm in a WELBILT Vaimixer for 30 minutes into the aqueous slurry of fibers and aqueous $Ca(OH)_2$. The excess water was filtered from the received suspension until the total net weight was 5500 g, which included 1000 g of fiber, 500 g of ettringite, and 4000 g of water.

After filtration of the ettringite treated fibers, 400 g of Methocel 240 was added to the wet batch of ettringite treated fibers and mixed at 250 rpm for 30 minutes. The Methocel 240 was utilized as a rheology modifier and a binding agent. Then, 3500 g Gamma Sperse $CaCO_3$ was added to the mixture and mixed at 150 rpm for 20 minutes. The $CaCO_3$ was utilized as a filler.

Example 2

In this example, fibers were treated with ettringite according to the following equation:

$$4aO \cdot 3Al_2O \cdot SO_3 + 2CaSO_4 2H_2O + 3H_2O => 3CaO \cdot Al_2O_3 \cdot 3Ca(SO_4) \cdot 32H_2O + 2Al_2O_3 3H_2O$$

Ettringite treated fibers were obtained by first dispersing 1000 g of dry Hard Wood fiber in 10,000 g water using a WELBILT Vaimixer at 200 rpm for 30 minutes. To this mixture, a preblended solid was introduced that comprised 243 g of $4CaO \cdot 3Al_2O_3 \cdot SO_3$ and 137 g of $CaSO_4 \cdot 2H_2O$. The preblended solid and the mixture were mixed at 150 rpm for 30 minutes to form a suspension. The excess water was filtered from the received suspension until the total net weight was 5500 g, which included 1000 g of fiber, 500 g of ettringite, and 4000 g of water.

After filtration of the ettringite treated fibers, 400 g of Methocel 240 was added to the wet batch of ettringite treated fibers and mixed at 250 rpm for 30 minutes. The Methocel 240 was utilized as a rheology modifier and a binding agent. Then, 3500 g Gamma Sperse $CaCO_3$ was added to the mixture and mixed at 150 rpm for 20 minutes. The $CaCO_3$ was utilized as a filler.

Example 3

In this example, fibers were treated with ettringite according to the following equation:

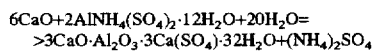
$$6CaO + 2AlNH_4(SO_4)_2 \cdot 12H_2O + 20H_2O = \\ > 3CaO \cdot Al_2O_3 \cdot 3Ca(SO_4) \cdot 32H_2O + (NH_4)_2SO_4$$

Ettringite treated fibers were obtained by first dispersing 1000 g of dry Hard Wood fiber in 10,000 g water using a WELBILT Vaimixer at 200 rpm for 30 minutes. To this mixture, a preblended solid was introduced that comprised 234 g of CaO and 361 g of AlNH$_4$(SO$_4$)$_2$·12H$_2$O. The preblended solid and the mixture were mixed at 150 rpm for 30 minutes to form a suspension. The excess water was filtered from the received suspension until the total net weight was 5500 g, which included 1000 g of fiber, 500 g of ettringite, and 4000 g of water.

After filtration of the ettringite treated fibers, 400 g of Methocel 240 was added to the wet batch of ettringite treated fibers and mixed at 250 rpm for 30 minutes. The Methocel 240 was utilized as a rheology modifier and a binding agent. Then, 3500 g Gamma Sperse CaCO$_3$ was added to the mixture and mixed at 150 rpm for 20 minutes. The CaCO$_3$ was utilized as a filler.

Example 4

In this example, fibers were treated with ettringite according to the following equation:

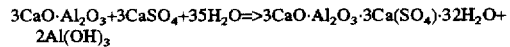
$$3CaO \cdot Al_2O_3 + 3CaSO_4 + 35H_2O => 3CaO \cdot Al_2O_3 \cdot 3Ca(SO_4) \cdot 32H_2O + 2Al(OH)_3$$

Ettringite treated fibers were obtained by first dispersing 1000 g of dry Hard Wood fiber in 10,000 g water using a WELBILT Vaimixer at 200 rpm for 30 minutes. To this mixture, a preblended solid was introduced that comprised 189 g of CaO·Al$_2$O$_3$ and 163 g of Ca(SO$_4$). The preblended solid and the mixture were mixed at 150 rpm for 30 minutes to form a suspension. The excess water was filtered from the received suspension until the total net weight was 5500 g, which included 1000 g of fiber, 500 g of ettringite, and 4000 g of water.

After filtration of the ettringite treated fibers, 400 g of Methocel 240 was added to the wet batch of ettringite treated fibers and mixed at 250 rpm for 30 minutes. The Methocel 240 was utilized as a rheology modifier and a binding agent. Then, 3500 g Gamma Sperse CaCO$_3$ was added to the mixture and mixed at 150 rpm for 20 minutes. The CaCO$_3$ was utilized as a filler.

III. SUMMARY

From the foregoing, it will be appreciated that the present invention provides novel compositions and methods for treating fibers to make them more chemically and mechanically compatible with hydraulically settable materials, particularly cementitious materials, thereby allowing the fibers to impart greater tensile and flexural strength to the hydraulically settable materials.

The present invention provides compositions and methods for mineralizing the surface of fibers in order to render the fibers more chemically and mechanically compatible with a hydraulically settable binder.

The present invention also provides compositions and methods for yielding mineralized fibers in which the deposited minerals result in significantly increased mechanical anchoring of the fibers within the hydraulically settable matrix.

Finally, the present invention provides compositions and methods for treating aggregates in order to increase the strength of the bond between the aggregates and the hydraulically settable structural matrix.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A mineralized composite material comprising;
   a substantially nonreactive substrate material selected from the group consisting of fibers and aggregates; and
   ettringite formed on at least a portion of a surface of the substrate material.

2. A mineralized composite material as defined in claim 1, wherein the ettringite covers at least about 25% of the surface of the substrate material.

3. A mineralized composite material as defined in claim 1, wherein the ettringite covers at least about 50% of the surface of the substrate material.

4. A mineralized composite material as defined in claim 1, wherein the ettringite covers at least about 75% of the surface of the substrate material.

5. A mineralized composite material as defined in claim 1, wherein the ettringite covers about 100% of the surface of the substrate material.

6. A mineralized composite material as defined in claim 1, wherein the substantially nonreactive substrate material comprises organic fibers.

7. A mineralized composite material as defined in claim 6, wherein the fibers comprise polyvinyl alcohol fibers.

8. A mineralized composite material as defined in claim 6, wherein the fibers comprise polylactic acid fibers.

9. A mineralized composite material as defined in claim 1, wherein the fibers are selected from the group consisting of cellulosic fibers, wood fibers, plant fibers, protein fibers, organic polymer fibers, ceramic fibers, carbon fibers, metal fibers and mixtures of the foregoing.

10. A mineralized composite material as defined in claim 1, wherein the fibers comprise steel fibers.

11. A mineralized composite material as defined in claim 1, wherein the substantially nonreactive substrate material comprises an aggregate material.

12. A mineralized composite material as defined in claim 11, wherein the aggregate material comprises a naturally occurring mineral material.

13. A mineralized composite material as defined in claim 11, wherein the aggregate material comprises a synthetic material.

14. A mineralized composite material as defined in claim 11, wherein the aggregate material is selected from the group consisting of sand, gravel, rocks, limestone, silica, alumina, slags, expanded clay, talc, chalk and shale.

15. A mineralized fibrous composite comprising a fibrous substrate material and ettringite formed on at least a portion of a surface of the fibrous substrate material.

16. A mineralized aggregate composite comprising an aggregate substrate material and ettringite formed on at least a portion of a surface of the aggregate substrate material.

17. A method for manufacturing a mineralized composite material comprising the steps of;
   providing a substantially nonreactive substrate material selected from the group consisting of fibers and aggregates;

mixing together the substantially nonreactive substrate material, water, and at least two chemical reactants which form ettringite when combined in the presence of water to form an aqueous suspension, wherein ettringite formed within the aqueous suspension is deposited onto at least a portion of a surface of the substrate material to form the mineralized composite material; and isolating the mineralized composite material from the aqueous suspension.

18. A method for manufacturing a mineralized composite material as defined in claim 17, wherein the at least two chemical reactants which form ettringite when combined in the presence of water include are $Ca(OH)_2$ and $Al_2(SO_4)_3 \cdot 18H_2O$.

19. A method for manufacturing a mineralized composite material as defined in claim 17, wherein the at least two chemical reactants which form ettringite when combined in the presence of water include $4CaO \cdot 3Al_2O_3 \cdot SO_3$ and $2CaSO_4 \cdot 2H_2O$.

20. A method for manufacturing a mineralized composite material as defined in claim 17, wherein the at least two chemical reactants which form ettringite when combined in the presence of water include CaO and $2AlNH_4(SO_4)_2 \cdot 12H_2O$.

21. A method for manufacturing a mineralized composite material as defined in claim 17, wherein the at least two chemical reactants which form ettringite when combined in the presence of water include $3CaO \cdot Al_2O_3$ and $CaSO_4$.

22. A method for manufacturing a mineralized composite material as defined in claim 17, wherein the substantially nonreactive substrate material comprises a fibrous material.

23. A method for manufacturing a mineralized composite material as defined in claim 22, wherein the fibrous material is selected from the group consisting of cellulosic fibers, wood fibers, plant fibers, protein fibers, organic polymer fibers, ceramic fibers, carbon fibers, and metal fibers.

24. A method for manufacturing a mineralized composite material as defined in claim 17, wherein the substantially nonreactive substrate material comprises an aggregate material.

25. A method for manufacturing a mineralized composite material as defined in claim 24, wherein the aggregate material comprises a naturally occurring mineral.

26. A method for manufacturing a mineralized composite material as defined in claim 24, wherein the aggregate material comprises a synthetic material.

27. A method for manufacturing a mineralized composite material as defined in claim 17, wherein the mineralized composite material is isolated from the suspension by draining the aqueous phase from the aqueous suspension.

28. A method for manufacturing a mineralized composite material as defined in claim 17, further comprising the step of washing the mineralized composite material with water.

29. A method for manufacturing a mineralized composite material comprising the steps of;

providing a substantially nonreactive substrate material selected from the group consisting of fibers and aggregates;

mixing together water, the substantially nonreactive substrate material, and $Ca(OH)_2$ to form an aqueous suspension;

combining $Al_2(SO_4)_3 \cdot 18H_2O$ with the aqueous suspension such that it reacts with the $Ca(OH)_2$ to form ettringite, which is thereby precipitated onto at least a portion of a surface of the substrate material in order to form the mineralized composite material; and isolating the mineralized composite material from the suspension.

30. A method for manufacturing a mineralized composite material comprising the steps of;

providing a substantially nonreactive substrate material selected from the group consisting of fibers and aggregates;

forming an aqueous slurry by combining water and the nonreactive substrate material;

separately blending at least two chemical reactants in a substantially dry form which will form ettringite when combined with water to form a substantially dry blended mixture of the at least two chemical reactants;

combining the substantially dry blended mixture of the at least two chemical reactants with the aqueous slurry to form an aqueous suspension, thereby causing the at least two chemical reactants to form ettringite which is deposited onto at least a portion of a surface of the substrate material to form the mineralized composite material; and isolating the mineralized composite material from the suspension.

31. A method for manufacturing a composite material as defined in claim 30, wherein the at least two chemical reactants which form ettringite when combined in the presence of water are $4CaO \cdot 3Al_2O_3 \cdot SO_3$ and $2CaSO_4 \cdot 2H_2O$.

32. A method for manufacturing a composite material as defined in claim 30, wherein the at least two chemical reactants which form ettringite when combined in the presence of water are CaO and $2AlNH_4(SO_4)_2 \cdot 12H_2O$.

33. A method for manufacturing a composite material as defined in claim 30, wherein the at least two chemical reactants which form ettringite when combined in the presence of water are $3CaO \cdot Al_2O_3$ and $CaSO_4$.

* * * * *

UNITED STATES PATENT AND TRADEMARK OFFICE
CERTIFICATE OF CORRECTION

PATENT NO.  : 5,786,080
DATED       : July 28, 1998
INVENTOR(S) : Per Just Andersen; Shaode Ong; Simon K. Hodson Page 1 of 1

It is certified that error appears in the above-identified patent and that said Letters Patent is hereby corrected as shown below:

Column 1,
Line 20, after "Such" insert -- a --

Column 6,
Line 10, after "generally" change "do" to -- does --

Column 8,
Line 19, after "water" change "are" to -- is --

Column 9,
Line 66, after "As" delete -- s --

Column 10,
Line 48, change "4a·O3Al$_2$O·SO$_3$+2CaSO$_4$2H$_2$O=" to --4Cao.3Al$_2$O$_3$·SO$_3$+2CaSO$_4$2H$_2$O+31H$_2$O= --

Line 49, change ">3CaO·Al$_2$O$_3$·3Ca(SO$_4$)·32H$_2$O+2Al$_2$O$_3$3H$_2$O" to -- 3CaO·Al$_2$O$_3$·3Ca(SO$_4$)·32H$_2$O+2Al$_2$O$_3$·3H$_2$O --

Column 13,
Line 14, after "include" delete -- are --

Signed and Sealed this

Sixteenth Day of October, 2001

*Attest:*

*Attesting Officer*

NICHOLAS P. GODICI
*Acting Director of the United States Patent and Trademark Office*